US011637620B2

(12) United States Patent
Schwab et al.

(10) Patent No.: US 11,637,620 B2
(45) Date of Patent: Apr. 25, 2023

(54) COVERAGE ENHANCEMENT FOR DISTRIBUTED ANTENNA SYSTEMS AND REPEATERS BY TIME-DIVISION BEAMFORMING

(71) Applicant: CommScope Technologies LLC, Hickory, NC (US)

(72) Inventors: Daniel Schwab, Gersthofen (DE); Stefan Eisenwinter, Buchdorf (DE)

(73) Assignee: CommScope Technologies LLC, Hickory, NC (US)

( * ) Notice: Subject to any disclaimer, the term of this patent is extended or adjusted under 35 U.S.C. 154(b) by 76 days.

(21) Appl. No.: 16/944,872

(22) Filed: Jul. 31, 2020

(65) Prior Publication Data

US 2021/0058140 A1 Feb. 25, 2021

Related U.S. Application Data

(60) Provisional application No. 62/889,830, filed on Aug. 21, 2019.

(51) Int. Cl.
  *H04B 7/155* (2006.01)
  *H04W 16/28* (2009.01)
  (Continued)

(52) U.S. Cl.
  CPC ......... *H04B 7/1555* (2013.01); *H04B 7/0413* (2013.01); *H04B 17/318* (2015.01); *H04W 16/28* (2013.01); *H04W 24/08* (2013.01)

(58) Field of Classification Search
  CPC .... H04B 7/022; H04B 7/0413; H04B 7/0695; H04B 7/15528; H04B 7/1555;
  (Continued)

(56) References Cited

U.S. PATENT DOCUMENTS

| 4,129,870 A | * | 12/1978 | Toman | ...................... G01S 1/14 |
| | | | | 342/374 |
| 2011/0281579 A1 | * | 11/2011 | Kummetz | ............ H04B 7/2606 |
| | | | | 455/424 |

(Continued)

OTHER PUBLICATIONS

International Searching Authority, "International Search Report and Written Opinion from PCT Application No. PCT/US2020/044511", from Foreign Counterpart to U.S. Appl. No. 16/944,872, filed Nov. 17, 2020, pp. 1 through 12, Published: WO.

*Primary Examiner* — David B Lugo

(74) *Attorney, Agent, or Firm* — Fogg & Powers LLC

(57) ABSTRACT

Systems and methods for enhancing coverage of repeater systems by time-division beamforming are provided. A repeater system includes an interface configured to communicate signals with a base station and a phased antenna array. The phased antenna array includes a plurality of antenna elements, wherein the phased antenna array is configured to generate a beam in a plurality of predefined directions and wirelessly communicate signals with user equipment in a coverage area of the phased antenna array. The repeater system further includes a beamforming circuit communicatively coupled to the phased antenna array, wherein the beamforming circuit is configured to adjust a direction of the beam generated by the phased antenna array to correspond to one of the plurality of predefined directions at a particular time according to a schedule.

33 Claims, 4 Drawing Sheets

(51) Int. Cl.
*H04B 7/0413* (2017.01)
*H04B 17/318* (2015.01)
*H04W 24/08* (2009.01)

(58) Field of Classification Search
CPC .... H04B 17/26; H04B 17/318; H04B 17/382; H04W 24/08; H04W 16/28
See application file for complete search history.

(56) References Cited

U.S. PATENT DOCUMENTS

| | | | |
|---|---|---|---|
| 2013/0071112 A1* | 3/2013 | Melester | H04B 1/006 455/67.14 |
| 2016/0242159 A1 | 8/2016 | Ho et al. | |
| 2017/0164211 A1 | 6/2017 | Ho et al. | |
| 2017/0223689 A1 | 8/2017 | Son et al. | |
| 2018/0054790 A1* | 2/2018 | Islam | H04L 5/0048 |
| 2018/0331740 A1 | 11/2018 | Orhan et al. | |
| 2018/0351605 A1 | 12/2018 | Liang et al. | |
| 2019/0181943 A1* | 6/2019 | Liang | H04B 7/15507 |
| 2021/0029564 A1* | 1/2021 | Lupper | H04W 24/02 |
| 2021/0037445 A1* | 2/2021 | Abedini | H04W 40/22 |

* cited by examiner

COVERAGE ENHANCEMENT FOR DISTRIBUTED ANTENNA SYSTEMS AND REPEATERS BY TIME-DIVISION BEAMFORMING

BACKGROUND

This application claims the benefit of U.S. Provisional Application Ser. No. 62/889,830, filed Aug. 21, 2019, and titled "COVERAGE ENHANCEMENT FOR DISTRIBUTED ANTENNA SYSTEMS AND REPEATERS BY TIME-DIVISION BEAMFORMING," which is hereby incorporated herein by reference.

BACKGROUND

A major part of the fifth generation (5G) mobile communication standard is the utilization of the millimeter wave (mmWave) spectrum to transmit large signal bandwidths. Current mmWave transmitter deployments are operating in the frequency range between 24 GHz and 40 GHz and trials with frequencies up to 60 GHz are being executed. However, transmitting larger signal bandwidth at high frequencies comes with a cost since there is much higher penetration loss for the transmitted signals at higher frequencies compared to lower frequencies. Typically, the 5G next generation base stations, called Next Generation NodeB (gNB), include a sophisticated beam management capability that involves tracking the location of user equipment and communicating with the user equipment using highly directional antenna beams to compensate for the high penetration loss.

Repeater systems (such as distributed antenna systems or over-the-air repeaters) are often used to improve the coverage provided base stations. However, such repeater systems typically do not decode the signals that are being repeated and, therefore, are typically not able to track the locations of user equipment beam management capabilities.

SUMMARY

A repeater system includes an interface configured to communicate signals with a base station and a phased antenna array. The phased antenna array includes a plurality of antenna elements, wherein the phased antenna array is configured to generate a beam in a plurality of predefined directions and wirelessly communicate signals with user equipment in a coverage area of the phased antenna array. The repeater system further includes a beamforming circuit communicatively coupled to the phased antenna array, wherein the beamforming circuit is configured to adjust a direction of the beam generated by the phased antenna array to correspond to one of the plurality of predefined directions at a particular time according to a schedule.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
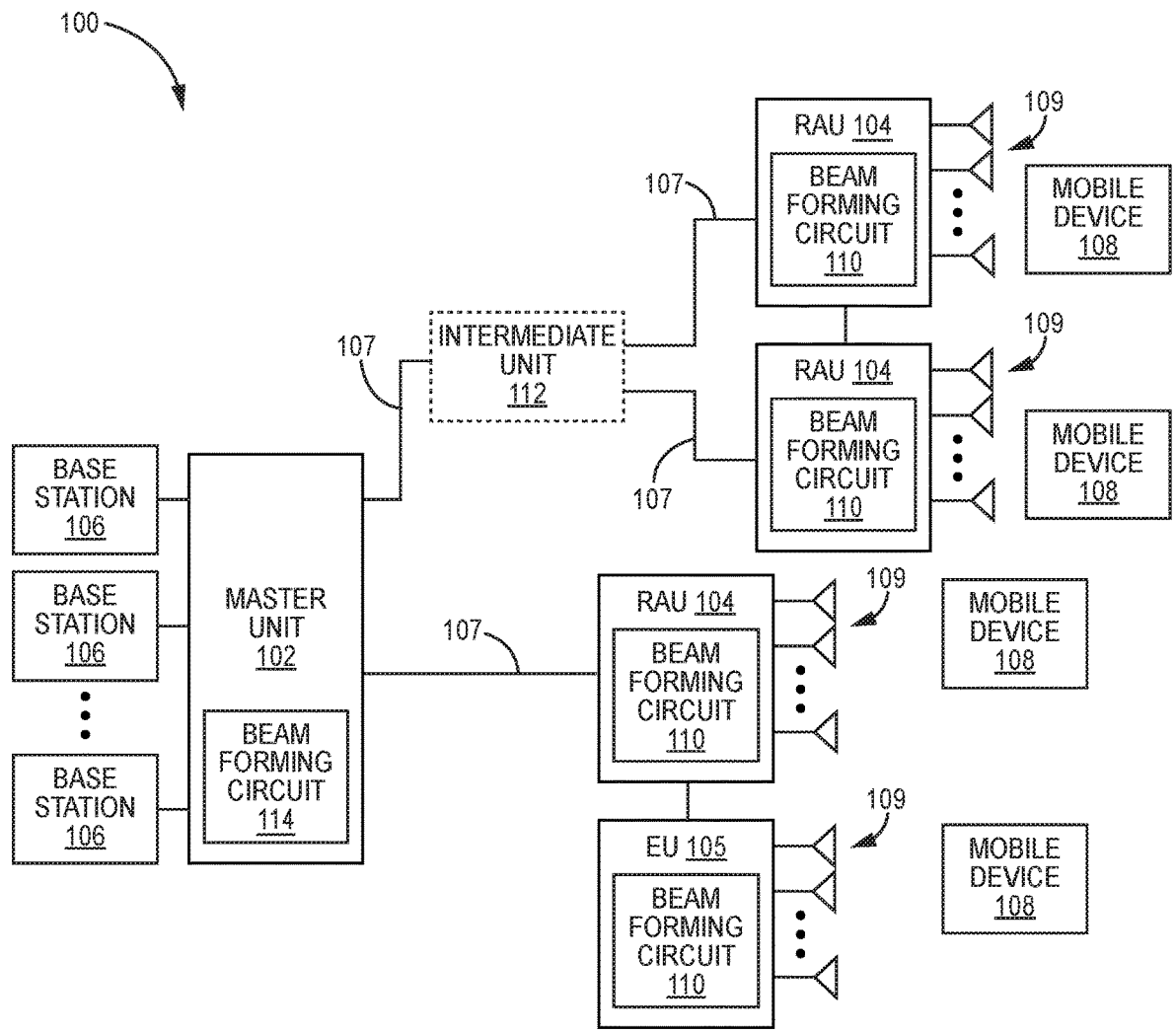
FIG. 1 is a block diagram of an example distributed antenna system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be used and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

For in-building distributed antenna system (DAS) deployments, antennas with a hemispherical radiation pattern are often used to cover large areas. However, for mmWave applications this would result in a limited coverage area due to the high penetration loss and the low directivity of such antennas. To overcome the penetration loss for transmitted signals, one approach is to increase the transmit power of the DAS. However, a higher transmit power does not compensate for the penetration loss for signals received by the DAS (for example, the signals received from the user equipment in the coverage area of the various remote antenna units of the DAS). Also, it cannot be assumed that the user equipment transmitting uplink signals in the mmWave spectrum will increase transmit power when communicating with a base station through a DAS, so high penetration losses in the uplink can still occur.

Another approach to addressing the high penetration loss experienced in such DAS deployments is to increase both the transmission strength of the DAS and the receive sensitivity at the same time by using directional beams (for example, generated by passive directional antennas). However, since the beam of passive directional antennas is static, coverage can only be provided to certain areas of the building while other areas of the building remain uncovered.

The example systems and methods described herein utilize phased antenna arrays in combination with respective beamforming circuits in remote units of a telecommunications system to increase the coverage area of the remote units and data rate for the network. In some examples, the phased antenna arrays are configured to generate beam(s) in predefined directions and wirelessly communicate signals with user equipment in a coverage area of the phased antenna array. In some examples, the beamforming circuits are configured to adjust a direction of the beam generated by the respective phased antenna array to correspond to different predefined directions at particular times according to a schedule or switching sequence.

While the description herein focuses on a DAS implementation, it should be understood that the techniques for time-division beamforming described herein can also be used for other types of radio distribution systems. For example, the techniques described herein could also be implemented in over-the-air repeaters, in-building small cells, cloud radio access networks, or the like to increase the coverage area of the radiating points and data rate for the networks.

FIG. 1 is a block diagram of an example distributed antenna system (DAS) 100. In the example of FIG. 1, the DAS 100 includes a master unit 102 communicatively coupled to one or more base stations 106 and one or more remote antenna units 104. While a single master unit 102 communicatively coupled to three base stations 106 and four remote antenna units 104, 105 in the DAS 100 is shown in FIG. 1, it should be understood that this is for ease of illustration and the DAS 100 can include any number of master units 102 and remote antenna units 104, 105 depending on the desired coverage and capacity for the DAS 100. Further, the master unit 102 can be communicatively coupled to any number of base stations 106.

In the example of FIG. 1, the DAS 100 includes one or more master units 102 (also referred to as "host units" or "central area nodes" or "central units") and one or more remote antenna units 104 (also referred to as "remote units" or "access points") that are communicatively coupled to the one or more master units 102. In this example, the DAS 100 comprises a digital DAS, in which DAS traffic is distributed between the master units 102 and the remote antenna units 104 in digital form. In other examples, the DAS 100 comprises an analog DAS, in which DAS traffic is distributed between the master units 102 and the remote antenna units 104 in analog form. In other examples, the DAS 100 comprises a hybrid DAS, in which DAS traffic is distributed between the master units and the remote units using a combination of digital and analog form. The DAS 100 can be deployed at a site to provide wireless coverage and capacity for one or more wireless network operators. The site may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

The master unit 102 is communicatively coupled to the plurality of base stations 106. One or more of the base stations 106 can be co-located with the respective master unit 102 to which it is coupled (for example, where the base station 106 is dedicated to providing base station capacity to the DAS 100). Also, one or more of the base stations 106 can be located remotely from the respective master unit 102 to which it is coupled (for example, where the base station 106 is a macro base station providing base station capacity to a macro cell in addition to providing capacity to the DAS 100). In this latter case, a master unit 102 can be coupled to a donor antenna using an over-the-air repeater in order to wirelessly communicate with the remotely located base station.

The base stations 106 can be implemented in a traditional manner in which a base band unit (BBU) is deployed at the same location with a remote radio head (RRH) to which it is coupled, where the BBU and RRH are coupled to each other using optical fibers over which front haul data is communicated as streams of digital IQ samples (for example, in a format that complies with one of the Common Public Radio Interface (CPRI), Open Base Station Architecture Initiative (OBSAI), and Open RAN (ORAN) families of specifications). Also, the base stations 106 can be implemented in other ways (for example, using a centralized radio access network (C-RAN) topology where multiple BBUs are deployed together in a central location, where each of BBU is coupled to one or more RRHs that are deployed in the area in which wireless service is to be provided. Also, the base station 106 can be implemented as a small cell base station in which the BBU and RRH functions are deployed together in a single package.

The master unit 102 can be configured to use wideband interfaces or narrowband interfaces to the base stations 106. Also, the master unit 102 can be configured to interface with the base stations 106 using analog radio frequency (RF) interfaces or digital interfaces (for example, using a CPRI, OBSAI, or ORAN digital IQ interface). In some examples, the master unit 102 interfaces with the base stations 106 via one or more wireless interface nodes (not shown). A wireless interface node can be located, for example, at a base station hotel, and group a particular part of a RF installation to transfer to the master unit 102.

Traditionally, a master unit 102 interfaces with one or more base stations 106 using the analog radio frequency signals that each base station 106 communicates to and from a mobile device 108 (also referred to as "mobile units" or "user equipment") of a user using a suitable air interface standard. Although the devices 108 are referred to here as "mobile" devices 108, it is to be understood that the devices 108 need not be mobile in ordinary use (for example, where the device 108 is integrated into, or is coupled to, a sensor unit that is deployed in a fixed location and that periodically wirelessly communicates with a gateway or other device). The DAS 100 operates as a distributed repeater for such radio frequency signals. RF signals transmitted from each base station 106 (also referred to herein as "downlink RF signals") are received at the master unit 102. In such examples, the master unit 102 uses the downlink RF signals to generate a downlink transport signal that is distributed to one or more of the remote antenna units 104. Each such remote antenna unit 104 receives the downlink transport signal and reconstructs a version of the downlink RF signals based on the downlink transport signal and causes the reconstructed downlink RF signals to be radiated from a phased antenna array 109 coupled to or included in that remote antenna unit 104. Each phased antenna array 109 can include two or more antenna elements.

In some aspects, the master unit 102 is directly coupled to the remote antenna units 104. In such aspects, the master unit 102 is coupled to the remote antenna units 104 using cables 107. For example, the cables 107 can include optical fiber or Ethernet cable complying with the Category 5, Category 5e, Category 6, Category 6A, or Category 7 specifications. Future communication medium specifications used for Ethernet signals are also within the scope of the present disclosure.

A similar process can be performed in the uplink direction. RF signals transmitted from mobile devices 108 (also referred to herein as "uplink RF signals") are received at one or more remote antenna units 104 via a phased antenna array 109. Each remote antenna unit 104 uses the uplink RF signals to generate an uplink transport signal that is transmitted from the remote antenna unit 104 to a master unit 102. The master unit 102 receives uplink transport signals transmitted from one or more remote antenna units 104 coupled to it. The master unit 102 can combine data or signals communicated via the uplink transport signals from multiple remote antenna units 104 (for example, where the DAS 100 is implemented as a digital DAS 100, by digitally summing corresponding digital samples received from the various remote antenna units 104) and generates uplink RF signals from the combined data or signals. In such examples, the master unit 102 communicates the generated uplink RF signals to one or more base stations 106. In this way, the coverage of the base stations 106 can be expanded using the DAS 100.

As noted above, in the example shown in FIG. 1, the DAS 100 is implemented as a digital DAS. In a "digital" DAS, signals received from and provided to the base stations 106 and mobile devices 108 are used to produce digital in-phase (I) and quadrature (Q) samples, which are communicated between the master unit 102 and remote antenna units 104. It is important to note that this digital IQ representation of the original signals received from the base stations 106 and from the mobile units still maintains the original modulation (that is, the change in the amplitude, phase, or frequency of a carrier) used to convey telephony or data information pursuant to the cellular air interface protocol used for wirelessly communicating between the base stations 106 and the mobile units. Examples of such cellular air interface protocols include, for example, the Global System for Mobile Communication (GSM), Universal Mobile Telecommunications System (UMTS), High-Speed Downlink Packet Access (HSDPA), Long-Term Evolution (LTE), Citizens Broadband Radio Service (CBRS), and fifth generation New Radio (5G NR) air interface protocols. Also, each stream of digital IQ samples represents or includes a portion of wireless spectrum. For example, the digital IQ samples can represent a single radio access network carrier (for example, a 5G NR carrier) onto which voice or data information has been modulated using a 5G NR air interface. However, it is to be understood that each such stream can also represent multiple carriers (for example, in a band of frequency spectrum or a sub-band of a given band of frequency spectrum).

In the example shown in FIG. 1, the master unit 102 can be configured to interface with one or more base stations 106 using an analog RF interface (for example, via the analog RF interface of an RRH or a small cell base station). In some examples, the base stations 106 can be coupled to the master unit 102 using a network of attenuators, combiners, splitters, amplifiers, filters, cross-connects, etc., which is referred to collectively as a point-of-interface (POI) (not shown). This is done so that, in the downlink, the desired set of RF carriers output by the base stations 106 can be extracted, combined, and routed to the appropriate master unit 102, and so that, in the uplink, the desired set of carriers output by the master unit 102 can be extracted, combined, and routed to the appropriate interface of each base station 106.

In the example shown in FIG. 1, in the downlink, the master unit 102 can produce digital IQ samples from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase (I) and quadrature (Q) samples. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum output by one or more base stations 106. Each portion of wireless radio frequency spectrum can include, for example, a band of wireless spectrum, a sub-band of a given band of wireless spectrum, or an individual wireless carrier.

Likewise, in the uplink, the master unit 102 can produce an uplink analog wireless signal from one or more streams of digital IQ samples received from one or more remote antenna units 104 by digitally combining streams of digital IQ samples that represent the same carriers or frequency bands or sub-bands received from multiple remote antenna units 104 (for example, by digitally summing corresponding digital IQ samples from the various remote antenna units 104), digitally up-converting the combined digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined. The analog signal can be produced in other ways (for example, where the digital IQ samples are provided to a quadrature digital-to-analog converter that directly produces the analog IF or baseband signal).

In the example shown in FIG. 1, the master unit 102 can be configured to interface with one or more base stations 106 using a digital interface (in addition to, or instead of) interfacing with one or more base stations 106 via an analog RF interface. For example, the master unit 102 can be configured to interact directly with one or more BBUs using the digital IQ interface that is used for communicating between the BBUs and RRHs (for example, using the CPRI serial digital IQ interface).

In the downlink, the master unit 102 terminates one or more downlink streams of digital IQ samples provided to it from one or more BBUs and, if necessary, converts (by re-sampling, synchronizing, combining, separating, gain adjusting, etc.) them into downlink streams of digital IQ samples compatible with the remote antenna units 104 used in the DAS 100. In the uplink, the master unit 102 receives uplink streams of digital IQ samples from one or more remote antenna units 104, digitally combining streams of digital IQ samples that represent the same carriers or frequency bands or sub-bands received from multiple remote antenna units 104 (for example, by digitally summing corresponding digital IQ samples received from the various remote antenna units 104), and, if necessary, converts (by re-sampling, synchronizing, combining, separating, gain adjusting, etc.) them into uplink streams of digital IQ samples compatible with the one or more BBUs that are coupled to that master unit 102.

In the downlink, each remote antenna unit 104 receives streams of digital IQ samples from the master unit 102, where each stream of digital IQ samples represents a portion of wireless radio frequency spectrum output by one or more base stations 106. Each remote antenna unit 104 generates, from the downlink digital IQ samples, one or more downlink RF signals for radiation from the one or more antennas coupled to that remote antenna unit 104 for reception by any mobile devices 108 in the associated coverage area. In the uplink, each remote antenna unit 104 receives one or more uplink radio frequency signals transmitted from any mobile devices 108 in the associated coverage area, generates one or more uplink streams of digital IQ samples derived from the received one or more uplink radio frequency signals, and transmits them to the master unit 102.

Each remote antenna unit 104, 105 can be communicatively coupled directly to one or more master units 102 or indirectly via one or more other remote antenna units 104 and/or via one or more intermediate units 112 (also referred to as "expansion units" or "transport expansion nodes"). The latter approach can be done, for example, in order to increase the number of remote antenna units 104 that a single master unit 102 can feed, to increase the master-unit-to-remote-antenna-unit distance, and/or to reduce the amount of cabling needed to couple a master unit 102 to its associated remote antenna units 104. The expansion units are coupled to the master unit 102 via one or more cables 107.

In the example DAS 100 shown in FIG. 1, a remote antenna unit 104 is shown having another co-located remote antenna unit 105 (also referred to herein as an "extension unit") communicatively coupled to it. Subtending a co-located extension remote antenna unit 105 from another remote antenna unit 104 can be done in order to expand the number of frequency bands that are radiated from that same location and/or to support MIMO service (for example, where different co-located remote antenna units radiate and receive different MIMO streams for a single MIMO frequency band). The remote antenna unit 104 is communicatively coupled to the "extension" remote antenna units 105 using a fiber optic cable, a multi-conductor cable, coaxial cable, air-link, or the like. In such an implementation, the remote antenna units 105 are coupled to the master unit 102 of the DAS 100 via the remote antenna unit 104.

In some examples, the remote antenna units 104 of the DAS 100 include a beamforming circuit 110 configured to control a phased antenna array 109. In some examples, the phased antenna array 109 can be a line array, planar array, or a three-dimensional array depending on the desired antenna patterns for the telecommunications system 100. The phased antenna array 109 can be included in a respective remote antenna unit 104 or coupled to the respective remote antenna unit 104. In some examples, the phased antenna array 109 is an active phased array or a passive antenna array. In other examples, other types of phased antenna arrays (for example, fixed phased antenna array) could also be used. The particular phased antenna array 109 for the remote antenna units 104 can be the same (for example, all active phased antenna arrays) or the phased antenna arrays 109 can be different depending on the remote antenna unit 104.

The beamforming circuit 110 of the respective remote antenna units 104 is configured to steer the beam(s) of a phased antenna array 109 in different directions that cover the service areas of the DAS 100. In some examples, the beamforming circuit 110 is configured to modify the beam direction according to a predefined pattern or switching sequence in a time-dependent manner. In some examples, a respective beamforming circuit 110 is configured to adjust the direction of the beam generated by a respective phased antenna array 109 by modifying a phase and/or amplitude of the signals transmitted by each antenna element of the phased antenna array 109 with respect to each other.

Figure 2A:
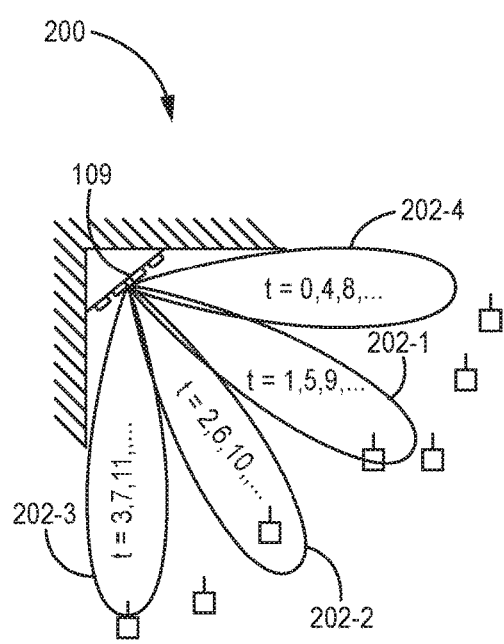
FIGS. 2A-2B are schematic diagrams example beam patterns for radiating points of a distributed antenna system.
Figure 2B:
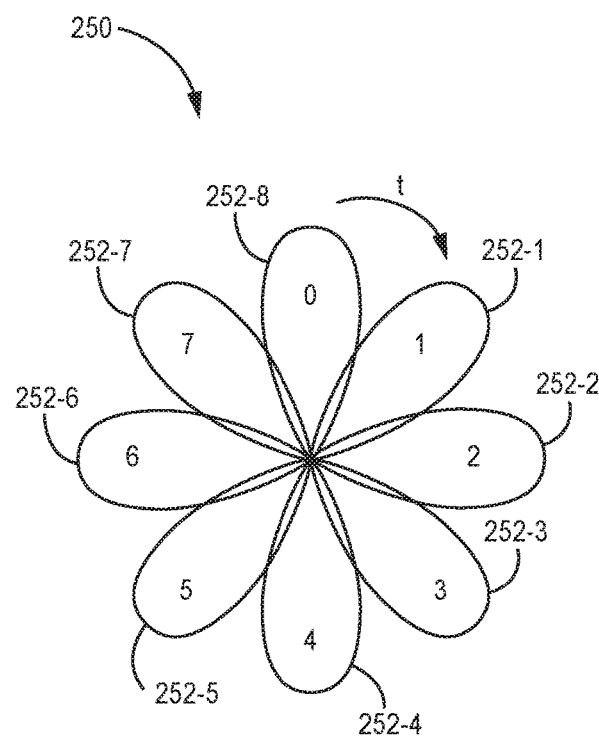

FIGS. 2A-2B illustrate example beam patterns 200, 250 that can be generated using a beamforming circuit 110 and phased antenna array 109. In the examples shown in FIG. 2B, the beamforming circuit 110 is configured to control the phased antenna array 109 of a remote antenna unit 104 to adjust the direction of the beam generated by phased antenna array between four different directions. The beamforming circuit 110 is configured to switch or adjust the steering direction of the phased antenna array 109 every time interval (for example, every millisecond) to be in alignment with a predefined pattern. Any time interval can be used depending on the coverage and capacity requirements for the coverage area of the remote antenna units 104.

In the example shown in FIG. 2A, the beamforming circuit 110 of a remote antenna unit 104 is configured to generate a beam 202 in four different directions using the phased antenna array 109. In the example shown in FIG. 2A, the four beams cover up to approximately 90 degrees. In another example shown in FIG. 2B, the beamforming circuit 110 of a remote antenna unit 104 is configured to generate a beam 252 in eight different directions using the phased antenna array 109. In the example shown in FIG. 2B, the eight beams cover up to approximately 360 degrees. In the examples shown in FIGS. 2A-2B, the beamforming circuit 110 is configured to adjust the direction of the beam sequentially through the different beam directions and repeat the sequence.

In another example (not shown), the beamforming circuit 110 of a remote antenna unit 104 is configured to generate two beams pointing in opposite directions. In such examples, the beamforming circuit 110 can switch the steering direction of both beams synchronously such that the beams are always 180 degrees from each other. Such examples double the coverage area without producing interference in most circumstances.

While specific examples of beam patterns and beam directions are described above, it should be understood that the phased antenna arrays 109 of the remote antenna units 104 can be configured to generate any number of beams in any number of directions depending on the desired coverage. The number of beams and/or number of beam directions that can be generated is dependent on the size of the phased antenna array 109 (for example, the number of antenna elements), which is limited by the desired cost for the phased antenna array 109.

In some examples, the predefined pattern or sequence for switching the direction of the beam(s) generated by the phased antenna array 109 does not change after it is set. As conditions change in the coverage area of the remote antenna units 104 (for example, users moving in/out of the coverage area), it may be desirable to adapt the sequence for switching the direction of the beam(s) generated by the phased antenna array 109 to accommodate the changing conditions. The beamforming circuit 110 of the remote antenna units 104 can utilize data indicating the current and/or likely future conditions in the coverage area to improve the switching sequence.

In some examples, one or more of the remote antenna units 104 also include a measurement device configured to measure the composite transmit power level for given beam directions. By measuring the composite transmit power, an indirect measurement of the throughput requirements for the given beam directions can be estimated. After statistical evaluation, the predefined pattern or switching sequence could be adapted to give higher priority to certain directions that require more throughput. In other examples, (for example, where the predefined pattern or sequence for switching the direction of the beam(s) generated by the phased antenna array 109 does not change after it is initially set), the measurement device is omitted.

In some examples, one or more of the remote antenna units 104 include a measurement device configured to measure the composite receive power level for given beam directions. The measurement device configured to measure the composite receive power level can be the same as the measurement device configured to measure the transmit power level or it could be a different measurement device. In some examples, the measurement device configured to measure the composite receive power level is a Received Signal Strength Indicator (RSSI) detector. The measurement of the receive power level provides an indirect indication of where the mobile devices 108 are located in the coverage area of the remote antenna unit 104. After statistical evaluation, the predefined pattern or switching sequence could be adapted to give higher priority to certain directions that have higher populations of users.

In some examples, the beamforming circuit 110 is configured to prioritize steering the beam in a direction or directions with higher throughput requirements, which corresponds to the direction or directions where the measured composite transmit power was highest. In some examples, the beamforming circuit 110 is configured to prioritize steering the beam in a direction or directions with higher population of mobile devices 108, which corresponds to the directions where the measured composite receive power was highest. To prioritize these direction(s) having the higher throughput requirements and/or population of mobile devices 108, the beamforming circuit 110 can switch the beam generated by the phased antenna array 109 more frequently to these direction(s). For example, referring to FIG. 2A, if beam direction associated with beam 202-1 is determined to have higher throughput requirements or population of users that the other directions, then the beamforming circuit 110 can modify the switching sequence to switch to beam 202-1 more frequently than the other beams 202-2, 202-3, 202-4.

In some examples, one or more of the remote antenna units 104 include a user equipment (UE) location detection device (not shown) to provide location information for the mobile devices 108 to the beamforming circuit 110. In some examples, the location information is used to determine the number of mobile devices 108 and/or the throughput requirements in given beam directions. For example, the beamforming circuit 110 is configured to determine the number of mobile devices 108 in a respective beam direction by determining the number of mobile devices 108 having a position located within the known coverage area of the respective beam direction. In other examples, the location information is used to track the mobile devices 108 in the coverage area of the phased antenna array 109 and to adjust the direction of the beam(s) in real-time. The predefined pattern or switching sequence can be adapted to give higher priority to certain directions based on the location information of the mobile devices 108 from the UE location detection device.

In some examples, one or more of the remote antenna units 104 are communicatively coupled to a sub-system (not shown) that provides information on the location of the mobile devices 108 to the beamforming circuit 110. In some examples, the sub-system is separate from the remote antenna units 104 and communicatively coupled to the remote antenna units 104 using a wired or wireless link. In other examples, a respective sub-system is integrated in the remote antenna units 104. In some examples, the sub-system is a third-party sub-system that is not manufactured by the same entity that manufactures the DAS 100. In some examples, the location information from the sub-system is used to determine the number of mobile devices 108 and/or the throughput requirements in given beam directions. For example, the beamforming circuit 110 is configured to determine the number of mobile devices 108 in a respective beam direction by determining the number of mobile devices 108 having a position located within the known coverage area of the respective beam direction. In other examples, the location information is used to track the mobile devices 108 in the coverage area of the phased antenna array 109 and to adjust the direction of the beam(s) in real-time. The predefined pattern or switching sequence can be adapted to give higher priority to certain directions based on the location information of the mobile devices 108 from the sub-system.

In addition to measuring the composite power levels during operation, the measurement device can be configured to operate in a test mode where no downlink signals are provided to mobile devices 108 via the DAS 100. The test mode can be run at predetermined time intervals (for example, every minute) and the results can be used in order to avoid using beam directions where no users are present. In the test mode, the beamforming circuit 110 is configured to adjust (scan) the phased antenna array 109 through all beam directions and the measurement device is configured to measure the composite receive power for each beam direction. In some examples, the beamforming circuit 110 is configured to skip beam directions in the switching sequence when the measured composite receive power during the test mode is below a threshold, which can be set at a value such that a signal power level below the threshold is indicative of no uplink signals being transmitted from a mobile device 108. For the beam directions with a composite receive power below the threshold, it can be assumed that no mobile devices 108 are positioned in that direction, and the beamforming circuit 110 is configured to modify the switching sequence such that those beam directions are skipped during operation. In other words, the beamforming circuit 110 is configured to only utilize beam directions where mobile devices 108 are present.

In some examples, the installer or operator of the DAS 100 may also configure the beamforming circuit 110 to skip certain beam directions depending on the surroundings of the particular remote antenna units 104. In some examples, if there is an obstacle (for example, pillar, wall, etc.) preventing users from being located in a particular beam direction for a particular remote antenna unit 104, then the beamforming circuit 110 of the particular remote antenna unit 104 can be configured to skip that beam direction. In some examples, the remote antenna units 104 can implement a management interface by which a user (for example, installer or operator) is able to directly interact with the remote antenna unit 104 generally and configure the beamforming circuit 110 to skip particular beam directions. This management interface can be implemented in various ways including, for example, by implementing a web server that serves web pages that implement a web-based graphical user interface for a user to interact with the beamforming circuit 110 using a web browser and/or by implementing a command-line interface by which a user is able to interact with the beamforming circuit 110, for example, using secure shell (SSH) software.

In examples where two remote antenna units 104 (for example, remote antenna unit 104 and extension unit 105) are used for MIMO transmissions, the beams generated by the phased antenna arrays 109 of the remote antenna unit 104 and the extension unit 105 should be correlated so the different MIMO beams are coordinated. In other words, the switching sequence for beamforming for all the MIMO remote antenna units 104, 105 should be the same. In some examples, the remote antenna units 104, 105 configured to perform MIMO transmissions are configured to communicate in order to synchronize the respective switching sequences. In examples where a remote antenna unit 104 and an extension unit 105 are used for MIMO transmission, the cable coupling the remote antenna unit 104 and the extension unit 105 can be used for such communications. In examples where two remote antenna units 104 are used for MIMO transmission and are not directly coupled, the remote antenna units 104 are configured to communicate with each other via the master unit 102.

The scheduler of a base station 106 allocates mobile devices 108 to certain timeslots or resource blocks of an OFDM signal for LTE or 5G applications. Since the base stations 106 are generally not aware of the DAS 100 or the switching sequence(s) described above, in some examples, the DAS 100 is configured to communicate the switching sequence implemented by each beamforming circuit 110 to the base station(s) 106 such that the switching directions of the phased antenna arrays 109 can be considered by the base station scheduler. In examples where the base station 106 and DAS 100 are from the same manufacturer, a protocol can be defined by the manufacturer to advise the scheduler of the switching directions of the phased antenna arrays 109. For 5G deployments, the DAS 100 can be configured to communicate the switching information to the base station scheduler using a 4G connection. Other communication protocols can also be used for the DAS 100 to provide this information to the base stations 106.

In some examples, the master unit 102 of the DAS 100 can include a beamforming circuit 114 configured to communicate signals with a base station 106 using beamforming techniques similar to those described above. In examples where the master unit 102 is connected over the air to a base station 106, there may be redundant base stations 106 configured to provide capacity to the DAS 100. In such examples, the beamforming circuit 114 of the master unit 102 is configured to modify the beam direction generated by a phased antenna array included in or coupled to the master unit 102 in order to switch to a backup or redundant base station connection.

For larger DAS applications (for example, exhibition grounds or shopping malls), the individual remote antenna units 104 can be assigned to different base station sectors to provide enough capacity for the high number of users. In some examples, every sector might transmit signals on the same frequency due to a re-use factor of 1/1 (for example, in LTE or 5G). For the areas where two different sectors are contiguous, the intra-sector interference can limit the signal-to-interference-plus-noise ratio (SINR), which results in reduced data rate for the users. To overcome this problem, it is common to isolate the radiating points of different sectors by using antennas with specific static radiation patterns or by installing the radio points in a way to optimize (reduce) the corresponding interference.

Figure 3:
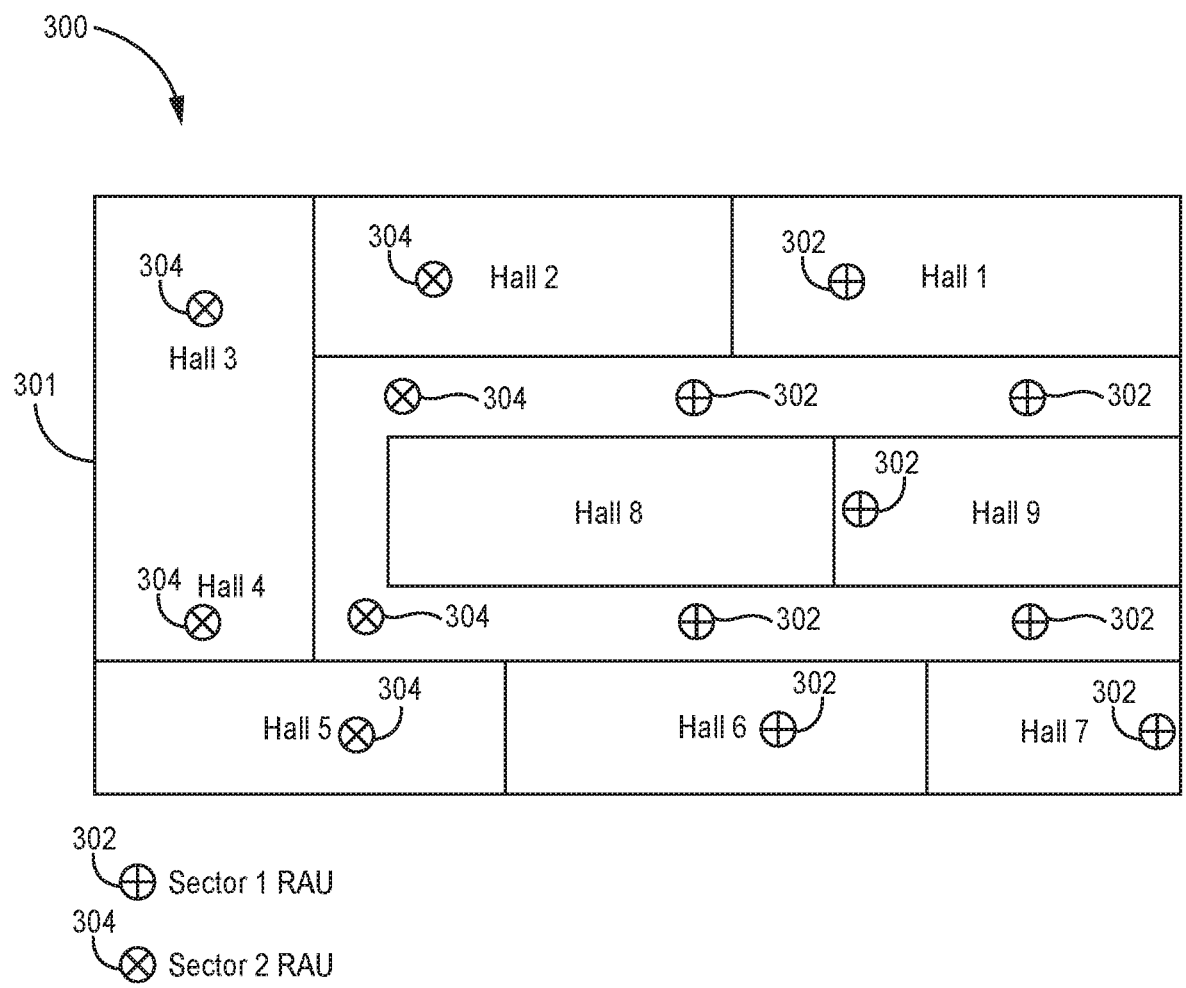
FIG. 3 is schematic diagram of an example two-sector deployment for radiating points of a distributed antenna system.
Figure 4:
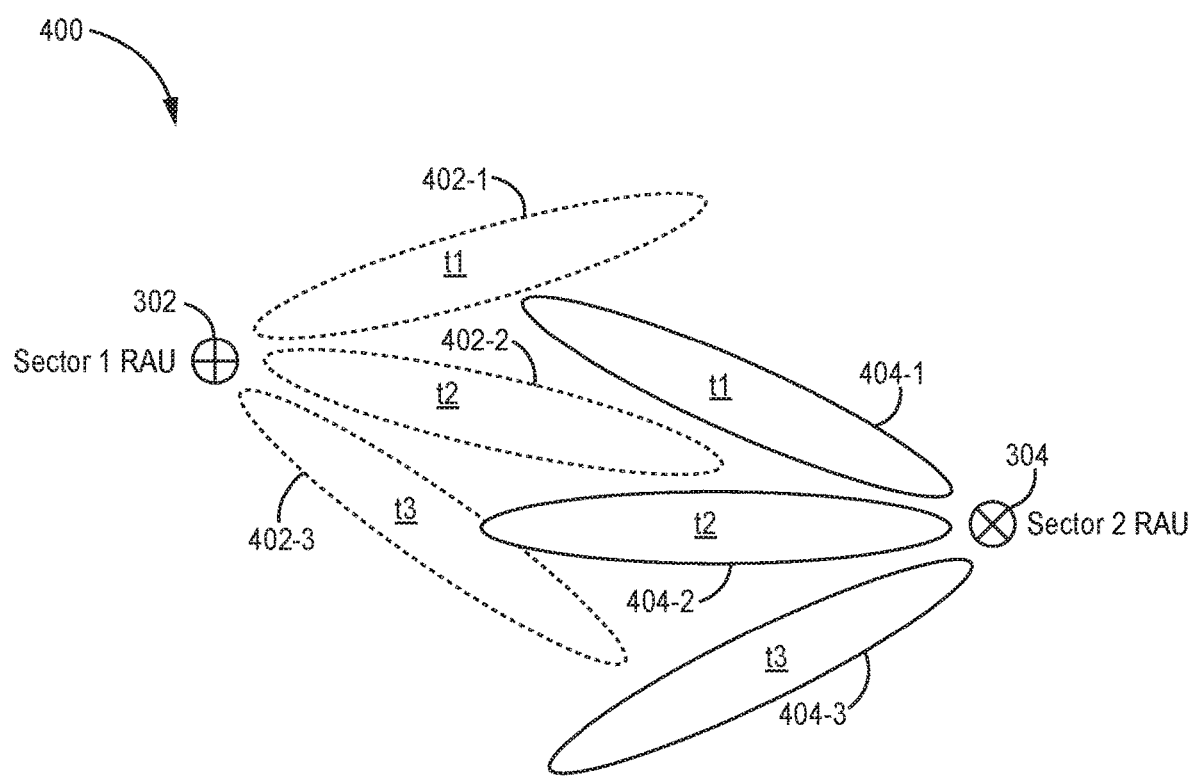
FIG. 4 is a schematic diagram of example beam pattern for a two-sector deployment for radiating points of a distributed antenna system.

FIGS. 3-4 are schematic diagrams of an example two-sector distributed antenna system deployment where the time-division beamforming techniques described above can be implemented. In the example shown in FIG. 3, remote antenna units 302, 304 are distributed throughout a service area 301 and assigned to different sectors. Sector 1 remote antenna units 302 and Sector 2 remote antenna units 304 are respectively configured to communicate using capacity from the respective base station sectors. For the areas where Sector 1 remote antenna units 302 and the Sector 2 remote antenna units 304 are contiguous, the beamforming circuits 110 in the respective remote antenna units 302, 304 are configured to coordinate the predefined positions or switching sequences such that an "interleaved" pattern is created as shown in FIG. 4. In some examples, the interleaved pattern includes beams 402 generated by a Sector 1 remote antenna unit 302 and beams 404 generated by a Sector 2 remote antenna unit 304 at different time intervals. The remote antenna units 302, 304 are configured to communicate via a master unit of the DAS, for example, in order to ensure that user equipment in the service area 301 receive coverage from only one out of the two sectors.

In some examples, the coordination of the individual beam directions can be optimized by calibration measurement once the DAS is installed (before operation). In some examples, the calibration could be realized by the use of portable measurement receivers or smartphones which are connected to the individual sectors. In other examples, the radiating points are equipped with a receiver functionality to determine the degree of interference. The collected information can then be communicated via the master unit of the DAS between the remote antenna units 302, 304 to remotely adjust the beam directions to lower the interference accordingly. After the calibration process, the DAS can coordinate the beams during operation to avoid any "beam collision" and thus ensures an interference optimized operation.

In some examples, the DAS can also be configured to disable the beam management of the base stations (for example, gNBs). If the base station is used to provide dedicated capacity to the DAS (for example, in-building applications), then the sophisticated beam management functionality of a gNB is not necessary. The initial access beam algorithm for the beam management functionality is also time consuming and may be disadvantageous for low delay applications. In some examples, the DAS is configured to perform at least some user equipment functionality in order to direct the base station as to where to steer the beam, which should reduce the amount of time the base station spends determining the direction.

The systems and methods described herein enable the coverage zone of the repeater or DAS to be expanded. Further, since directional beams are being used, the repeater or DAS is able to compensate for the high penetration losses of higher frequency ranges used in 5G. Also, by alternately changing the direction of the beam in a predefined manner, the phased antenna array can ensure that all user equipment within the coverage area obtain a certain data rate.

Compared to a single hemispherical or omnidirectional antenna pattern, the time-division beamforming implemented using the beamforming circuit 110 described herein has an increased coverage area due to the utilization of beamforming, which increases the transmit power as well as the receive sensitivity. Further, since the number of user equipment covered by the radiation points is larger, the overall data rate R from the network is increased. The total rate R is the sum of all individual rates $R_i$ for every beam:

$$R = \sum_{i=0}^{B-1} R_i$$

Within the equation, B is the number of beams and i is the control variable.

In various aspects, system elements, method steps, or examples described throughout this disclosure (such as the remote antenna units, master units, radiating points, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions.

These instructions are typically stored on any appropriate computer readable medium used for storage of computer readable instructions or data structures. The computer readable medium can be implemented as any available media that can be accessed by a general purpose or special purpose computer or processor, or any programmable logic device.

Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a repeater system, comprising: an interface configured to communicate signals with a base station; a phased antenna array comprising a plurality of antenna elements, wherein the phased antenna array is configured to generate a beam in a plurality of predefined directions and wirelessly communicate signals with user equipment in a coverage area of the phased antenna array; a beamforming circuit communicatively coupled to the phased antenna array, wherein the beamforming circuit is configured to adjust a direction of the beam generated by the phased antenna array to correspond to one of the plurality of predefined directions at a particular time according to a schedule.

Example 2 includes the repeater system of Example 1, further comprising: a measurement device communicatively coupled to the beamforming circuit, wherein the measurement device is configured to measure a power level of a downlink signal to be transmitted by the phased antenna array and/or a power level of an uplink signal received by the phased antenna array; wherein the beamforming circuit is configured to modify the schedule based on the measurements of the measurement device.

Example 3 includes the repeater system of Example 2, wherein the measurement device is configured to measure respective power levels of respective downlink signals in each predefined direction of the plurality of predefined directions.

Example 4 includes the repeater system of any of Examples 2-3, wherein the measurement device is configured to measure respective power levels of respective uplink signals in each predefined direction of the plurality of predefined directions.

Example 5 includes the repeater system of Example 4, wherein the measurement device comprises a received signal strength indicator (RSSI) detector configured to measure an uplink RSSI.

Example 6 includes the repeater system of any of Examples 2-5, wherein the beamforming circuit is configured to estimate a number of users located in each predefined direction based on a statistical analysis of the measurements of the measurement device.

Example 7 includes the repeater system of Example 6, wherein the beamforming circuit is configured to modify the schedule such that the beam of the phased antenna array is switched to a first predefined direction of the plurality of predefined directions more frequently than other predefined directions when the estimated number of users located in the first predefined direction is higher than the other predefined directions.

Example 8 includes the repeater system of any of Examples 6-7, wherein the beamforming circuit is configured to modify the schedule such that the beam of the phased antenna array is switched to a first predefined direction of the plurality of predefined directions less frequently than other predefined directions when the estimated number of users located in the first predefined direction is zero.

Example 9 includes the repeater system of any of Examples 2-8, wherein the repeater system is configured to operate in a test mode where downlink signals from the base station are not provided to user equipment via the repeater system; wherein the beamforming circuit is configured to adjust the beam of the phased antenna array to correspond to each predefined direction of the plurality of predefined directions during the test mode; wherein the measurement device is configured to measure a respective power level of an uplink signal received by the phased antenna array at each predefined direction of the plurality of predefined directions during the test mode; wherein the beamforming circuit is configured to modify the schedule to include predefined directions where the respective power level of the uplink signal received by the phased antenna array exceeds a threshold; wherein the beamforming circuit is configured to modify the schedule to exclude predefined directions where the respective power level of the uplink signal received by the phased antenna array is below the threshold.

Example 10 includes the repeater system of any of Examples 1-9, wherein the repeater system comprises a distributed antenna system having a master unit communicatively coupled to the base station and one or more remote antenna units communicatively coupled to and located remotely from the master unit, wherein a respective beamforming circuit is included in each of the one or more remote antenna units to control a respective phased antenna array, wherein the respective phased antenna array is included in or coupled to each of the one or more remote antenna units.

Example 11 includes the repeater system of Example 10, wherein the one or more remote antenna units comprises a plurality of remote antenna units configured to transmit in a multiple-input multiple-output (MIMO) configuration, wherein the schedule for each of the plurality of remote antenna units is synchronized.

Example 12 includes the repeater system of any of Examples 1-11, wherein the beamforming circuit is configured to communicate the schedule to the base station.

Example 13 includes the repeater system of any of Examples 1-12, wherein the beamforming circuit is configured to sequentially adjust a direction of the beam generated by the phased antenna array to correspond to each respective predefined direction of the plurality of predefined directions before repeating a predefined direction.

Example 14 includes the repeater system of any of Examples 1-13, wherein the repeater system comprises an over-the-air repeater.

Example 15 includes the repeater system of any of Examples 1-14, wherein the repeater system is configured to disable a beam management capability of the base station.

Example 16 includes the repeater system of any of Examples 1-15, wherein the repeater system is configured to perform at least some user equipment functionality in order to direct the base station to steer a beam toward the repeater system.

Example 17 includes the repeater system of any of Examples 1-16, further comprising: a location detection device communicatively coupled to the beamforming circuit, wherein the location detection device is configured to determine a location of mobile devices in the coverage area of the phased antenna array and provide the determined location of the mobile devices in the coverage area of the phased antenna array to the beamforming circuit; wherein the beamforming circuit is configured to modify the schedule based on the determined location of the mobile devices provided by the location detection device.

Example 18 includes the repeater system of any of Examples 1-17, wherein the repeater system is communicatively coupled to a sub-system configured to determine a location of mobile devices in the coverage area of the phased antenna array and provide the determined location of the mobile devices in the coverage area of the phased antenna array to the beamforming circuit; and wherein the beamforming circuit is configured to modify the schedule based on the determined location of the mobile devices provided by the sub-system.

Example 19 includes a distributed antenna system, comprising: a master unit communicatively coupled to a base station; and a plurality of remote antenna units communicatively coupled to and located remotely from the master unit, wherein the plurality of remote antenna units are distributed throughout a service area, wherein a first subset of the plurality of remote antenna units is configured to communicate wireless signals from a first base station sector, wherein a second subset of the plurality of remote antenna units is configured to communicate wireless signals from a second base station sector that is different from the first base station sector; wherein each respective remote antenna unit of the plurality of remote antenna units comprises: a beamforming circuit communicatively coupled to a phased antenna array included in or coupled to the respective remote antenna unit, wherein the phased antenna array is configured to generate a beam in a plurality of predefined directions and wirelessly communicate signals with user equipment in a coverage area of the phased antenna array, wherein the beamforming circuit is configured to adjust a direction of the beam generated by the phased antenna array to correspond to one of the plurality of predefined directions at a particular time according to a schedule; wherein the first subset of the plurality of remote antenna units and the second subset of the plurality of remote antenna units are configured to coordinate the respective schedules to avoid interference.

Example 20 includes the distributed antenna system of Example 19, wherein at least one remote antenna unit comprises: a measurement device communicatively coupled to the beamforming circuit, wherein the measurement device is configured to measure a power level of a downlink signal to be transmitted by the phased antenna array and/or a power level of an uplink signal received by the phased antenna array; wherein the beamforming circuit is configured to modify the schedule based on the measurements of the measurement device.

Example 21 includes the distributed antenna system of Example 20, wherein the measurement device is configured to measure respective power levels of respective downlink signals in each predefined direction of the plurality of predefined directions.

Example 22 includes the distributed antenna system of any of Examples 20-21, wherein the measurement device is configured to measure respective power levels of respective uplink signals in each predefined direction of the plurality of predefined directions.

Example 23 includes the distributed antenna system of Example 22, wherein the measurement device comprises a received signal strength indicator (RSSI) detector configured to measure an uplink RSSI.

Example 24 includes the distributed antenna system of any of Examples 20-23, wherein the beamforming circuit is configured to estimate a number of users located in each predefined direction based on a statistical analysis of the measurements of the measurement device.

Example 25 includes the distributed antenna system of Example 24, wherein the beamforming circuit is configured to modify the schedule such that the beam of the phased antenna array is switched to a first predefined direction of the plurality of predefined directions more frequently than other predefined directions when the estimated number of users located in the first predefined direction is higher than other predefined directions.

Example 26 includes the distributed antenna system of any of Examples 24-25, wherein the beamforming circuit is configured to modify the schedule such that the beam of the phased antenna array is switched to a first predefined direction of the plurality of predefined directions less frequently than other predefined directions when the estimated number of users located in the first predefined direction is zero.

Example 27 includes the distributed antenna system of any of Examples 20-26, wherein the distributed antenna system is configured to operate in a test mode where downlink signals from the base station are not provided to user equipment via the distributed antenna system; wherein the beamforming circuit is configured to adjust the beam of the phased antenna array to correspond to each predefined direction of the plurality of predefined directions during the test mode; wherein the measurement device is configured to measure a respective power level of an uplink signal received by the phased antenna array at each predefined direction of the plurality of predefined directions during the test mode; wherein the beamforming circuit is configured to modify the schedule to include predefined directions where the respective power level of the uplink signal received by the phased antenna array exceeds a threshold; wherein the beamforming circuit is configured to modify the schedule to exclude predefined directions where the respective power level of the uplink signal received by the phased antenna array is below the threshold.

Example 28 includes the distributed antenna system of any of Examples 19-27, wherein the one or more remote antenna units comprises a plurality of remote antenna units configured to transmit in a multiple-input multiple-output (MIMO) configuration, wherein the schedule for each of the plurality of remote antenna units is synchronized.

Example 29 includes the distributed antenna system of any of Examples 19-28, wherein the beamforming circuit is configured to communicate the schedules to the base station.

Example 30 includes the distributed antenna system of any of Examples 19-29, wherein the beamforming circuit is configured to sequentially adjust a direction of the beam generated by the phased antenna array to correspond to each respective predefined direction of the plurality of predefined directions before repeating a predefined direction.

Example 31 includes the distributed antenna system of any of Examples 19-30, wherein the distributed antenna system is configured to disable a beam management capability of the base station.

Example 32 includes the distributed antenna system of any of Examples 19-31, wherein the master unit is configured to perform at least some user equipment functionality in order to direct the base station to steer a beam toward the master unit.

Example 33 includes the distributed antenna system of any of Examples 19-32, where at least one remote antenna unit of the plurality of remote antenna units comprises: a location detection device communicatively coupled to the beamforming circuit, wherein the location detection device is configured to determine a location of mobile devices in the coverage area of the phased antenna array and provide the determined location of the mobile devices in the coverage area of the phased antenna array to the beamforming circuit; wherein the beamforming circuit is configured to modify the schedule based on the determined location of the mobile devices provided by the location detection device.

Example 34 includes the distributed antenna system of any of Examples 19-33, wherein at least one remote antenna unit of the plurality of remote antenna units is communicatively coupled to a sub-system configured to determine a location of mobile devices in the coverage area of the phased antenna array and provide the determined location of the mobile devices in the coverage area of the phased antenna array to the beamforming circuit; and wherein the beamforming circuit is configured to modify the schedule based on the determined location of the mobile devices provided by the sub-system.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A repeater system, comprising:
an interface configured to communicate signals with a base station;
a phased antenna array comprising a plurality of antenna elements, wherein the phased antenna array is configured to generate a beam in a plurality of predefined directions and wirelessly communicate downlink signals with user equipment in a coverage area of the phased antenna array with the beam;
a beamforming circuit communicatively coupled to the phased antenna array, wherein the beamforming circuit is configured to adjust a direction of the beam generated by the phased antenna array and used to wirelessly communicate downlink signals with user equipment in a coverage area of the phased antenna array to correspond to one of the plurality of predefined directions at particular times according to a switching sequence that repeats over time, wherein the beamforming circuit is configured to implement the switching sequence independently of control signals from the base station, wherein the beamforming circuit is configured to communicate the switching sequence to the base station such that the switching sequence implemented by the beamforming circuit can be considered by a scheduler of the base station.

2. The repeater system of claim 1, further comprising:
a measurement device communicatively coupled to the beamforming circuit, wherein the measurement device is configured to measure a power level of a downlink signal to be transmitted by the phased antenna array and/or a power level of an uplink signal received by the phased antenna array;
wherein the beamforming circuit is configured to modify the switching sequence based on the measurements of the measurement device.

3. The repeater system of claim 2, wherein the measurement device is configured to measure respective power levels of respective downlink signals in each predefined direction of the plurality of predefined directions.

4. The repeater system of claim 2, wherein the measurement device is configured to measure respective power levels of respective uplink signals in each predefined direction of the plurality of predefined directions.

5. The repeater system of claim 4, wherein the measurement device comprises a received signal strength indicator (RSSI) detector configured to measure an uplink RSSI.

6. The repeater system of claim 2, wherein the beamforming circuit is configured to estimate a number of users located in each predefined direction based on a statistical analysis of the measurements of the measurement device.

7. The repeater system of claim 6, wherein the beamforming circuit is configured to modify the switching sequence such that the beam of the phased antenna array is switched to a first predefined direction of the plurality of predefined directions more frequently than other predefined directions when the estimated number of users located in the first predefined direction is higher than the other predefined directions.

8. The repeater system of claim 6, wherein the beamforming circuit is configured to modify the switching sequence such that the beam of the phased antenna array is switched to a first predefined direction of the plurality of predefined directions less frequently than other predefined directions when the estimated number of users located in the first predefined direction is zero.

9. The repeater system of claim 2, wherein the repeater system is configured to operate in a test mode where downlink signals from the base station are not provided to user equipment via the repeater system;
wherein the beamforming circuit is configured to adjust the beam of the phased antenna array to correspond to each predefined direction of the plurality of predefined directions during the test mode;
wherein the measurement device is configured to measure a respective power level of an uplink signal received by the phased antenna array at each predefined direction of the plurality of predefined directions during the test mode;
wherein the beamforming circuit is configured to modify the switching sequence to include predefined directions where the respective power level of the uplink signal received by the phased antenna array exceeds a threshold;
wherein the beamforming circuit is configured to modify the switching sequence to exclude predefined directions where the respective power level of the uplink signal received by the phased antenna array is below the threshold.

10. The repeater system of claim 1, wherein the repeater system comprises a distributed antenna system having a master unit communicatively coupled to the base station and one or more remote antenna units communicatively coupled to and located remotely from the master unit, wherein a respective beamforming circuit is included in each of the one or more remote antenna units to control a respective phased antenna array, wherein the respective phased antenna array is included in or coupled to each of the one or more remote antenna units.

11. The repeater system of claim 10, wherein the one or more remote antenna units comprises a plurality of remote antenna units configured to transmit in a multiple-input multiple-output (MIMO) configuration, wherein the switching sequence for each of the plurality of remote antenna units is synchronized.

12. The repeater system of claim 1, wherein the beamforming circuit is configured to sequentially adjust a direction of the beam generated by the phased antenna array to correspond to each respective predefined direction of the plurality of predefined directions before repeating a predefined direction.

13. The repeater system of claim 1, wherein the repeater system comprises an over-the-air repeater.

14. The repeater system of claim 1, wherein the repeater system is configured to disable a beam management capability of the base station.

15. The repeater system of claim 1, wherein the repeater system is configured to perform at least some user equipment functionality in order to direct the base station to steer a beam toward the repeater system.

16. The repeater system of claim 1, further comprising:
a location detection device communicatively coupled to the beamforming circuit, wherein the location detection device is configured to determine a location of mobile devices in the coverage area of the phased antenna array and provide the determined location of the mobile devices in the coverage area of the phased antenna array to the beamforming circuit;
wherein the beamforming circuit is configured to modify the switching sequence based on the determined location of the mobile devices provided by the location detection device.

17. The repeater system of claim 1, wherein the repeater system is communicatively coupled to a sub-system configured to determine a location of mobile devices in the coverage area of the phased antenna array and provide the determined location of the mobile devices in the coverage area of the phased antenna array to the beamforming circuit; and
wherein the beamforming circuit is configured to modify the switching sequence based on the determined location of the mobile devices provided by the sub-system.

18. A distributed antenna system, comprising:
a master unit communicatively coupled to a base station; and
a plurality of remote antenna units communicatively coupled to and located remotely from the master unit, wherein the plurality of remote antenna units are distributed throughout a service area, wherein a first subset of the plurality of remote antenna units is configured to communicate wireless signals from a first base station sector, wherein a second subset of the plurality of remote antenna units is configured to communicate wireless signals from a second base station sector that is different from the first base station sector;
wherein each respective remote antenna unit of the plurality of remote antenna units comprises:
a beamforming circuit communicatively coupled to a phased antenna array included in or coupled to the respective remote antenna unit, wherein the phased antenna array is configured to generate a beam in a plurality of predefined directions and wirelessly communicate signals with user equipment in a coverage area of the phased antenna array, wherein the beamforming circuit is configured to adjust a direction of the beam generated by the phased antenna array to correspond to one of the plurality of predefined directions at a particular time according to a schedule;
wherein the first subset of the plurality of remote antenna units and the second subset of the plurality of remote antenna units are configured to coordinate the respective schedules to avoid interference.

19. The distributed antenna system of claim 18, wherein at least one remote antenna unit comprises:
a measurement device communicatively coupled to the beamforming circuit, wherein the measurement device is configured to measure a power level of a downlink signal to be transmitted by the phased antenna array and/or a power level of an uplink signal received by the phased antenna array;
wherein the beamforming circuit is configured to modify the schedule based on the measurements of the measurement device.

20. The distributed antenna system of claim 19, wherein the measurement device is configured to measure respective power levels of respective downlink signals in each predefined direction of the plurality of predefined directions.

21. The distributed antenna system of claim 19, wherein the measurement device is configured to measure respective power levels of respective uplink signals in each predefined direction of the plurality of predefined directions.

22. The distributed antenna system of claim 21, wherein the measurement device comprises a received signal strength indicator (RSSI) detector configured to measure an uplink RSSI.

23. The distributed antenna system of claim 19, wherein the beamforming circuit is configured to estimate a number of users located in each predefined direction based on a statistical analysis of the measurements of the measurement device.

24. The distributed antenna system of claim 23, wherein the beamforming circuit is configured to modify the schedule such that the beam of the phased antenna array is switched to a first predefined direction of the plurality of predefined directions more frequently than other predefined directions when the estimated number of users located in the first predefined direction is higher than other predefined directions.

25. The distributed antenna system of claim 23, wherein the beamforming circuit is configured to modify the schedule such that the beam of the phased antenna array is switched to a first predefined direction of the plurality of predefined directions less frequently than other predefined directions when the estimated number of users located in the first predefined direction is zero.

26. The distributed antenna system of claim 19, wherein the distributed antenna system is configured to operate in a test mode where downlink signals from the base station are not provided to user equipment via the distributed antenna system;
   wherein the beamforming circuit is configured to adjust the beam of the phased antenna array to correspond to each predefined direction of the plurality of predefined directions during the test mode;
   wherein the measurement device is configured to measure a respective power level of an uplink signal received by the phased antenna array at each predefined direction of the plurality of predefined directions during the test mode;
   wherein the beamforming circuit is configured to modify the schedule to include predefined directions where the respective power level of the uplink signal received by the phased antenna array exceeds a threshold;
   wherein the beamforming circuit is configured to modify the schedule to exclude predefined directions where the respective power level of the uplink signal received by the phased antenna array is below the threshold.

27. The distributed antenna system of claim 18, wherein the plurality of remote antenna units is configured to transmit in a multiple-input multiple-output (MIMO) configuration, wherein the schedule for each of the plurality of remote antenna units is synchronized.

28. The distributed antenna system of claim 18, wherein the beamforming circuit is configured to communicate the schedules to the base station.

29. The distributed antenna system of claim 18, wherein the beamforming circuit is configured to sequentially adjust a direction of the beam generated by the phased antenna array to correspond to each respective predefined direction of the plurality of predefined directions before repeating a predefined direction.

30. The distributed antenna system of claim 18, wherein the distributed antenna system is configured to disable a beam management capability of the base station.

31. The distributed antenna system of claim 18, wherein the master unit is configured to perform at least some user equipment functionality in order to direct the base station to steer a beam toward the master unit.

32. The distributed antenna system of claim 18, where at least one remote antenna unit of the plurality of remote antenna units comprises:
   a location detection device communicatively coupled to the beamforming circuit, wherein the location detection device is configured to determine a location of mobile devices in the coverage area of the phased antenna array and provide the determined location of the mobile devices in the coverage area of the phased antenna array to the beamforming circuit;
   wherein the beamforming circuit is configured to modify the schedule based on the determined location of the mobile devices provided by the location detection device.

33. The distributed antenna system of claim 18, wherein at least one remote antenna unit of the plurality of remote antenna units is communicatively coupled to a sub-system configured to determine a location of mobile devices in the coverage area of the phased antenna array and provide the determined location of the mobile devices in the coverage area of the phased antenna array to the beamforming circuit; and
   wherein the beamforming circuit is configured to modify the schedule based on the determined location of the mobile devices provided by the sub-system.

* * * * *